(12) United States Patent
Hildebrandt (10) Patent No.: US 6,371,719 B1
(45) Date of Patent: Apr. 16, 2002

(54) RECREATION VEHICLE CARRIER FOR A TRUCK

(76) Inventor: Leroy J. Hildebrandt, 2600 Indiana Ter., Ottawa, KS (US) 66067

( * ) Notice: Subject to any disclaimer, the term of this patent is extended or adjusted under 35 U.S.C. 154(b) by 0 days.

(21) Appl. No.: 09/483,273

(22) Filed: Jan. 13, 2000

(51) Int. Cl.$^7$ .............................................. B65G 67/02
(52) U.S. Cl. ......................... 414/537; 14/69.5; 296/10; 414/462
(58) Field of Search ................................ 414/537, 538, 414/539, 522, 921, 462; 296/3, 100.03; 224/42.32, 542, 544, 564, 497; 410/4, 8, 24

(56) References Cited

U.S. PATENT DOCUMENTS

| | | | |
|---|---|---|---|
| 3,757,972 A | | 9/1973 | Martin |
| 4,444,427 A | | 4/1984 | Martin |
| 4,874,284 A | | 10/1989 | New, Jr. |
| 4,974,898 A | * | 12/1990 | Baranski .................. 296/10 RV |
| 5,281,075 A | | 1/1994 | Tatman et al. |
| 5,494,393 A | | 2/1996 | Schrunk |
| 5,553,762 A | | 9/1996 | Brown |
| 5,741,038 A | | 4/1998 | Fowler et al. |

FOREIGN PATENT DOCUMENTS

| | | | | |
|---|---|---|---|---|
| CH | 350924 | * | 1/1961 | .................. 414/537 |
| FR | 1376467 | * | 9/1964 | .................. 414/537 |
| JP | 2-124335 | * | 5/1990 | .................. 414/537 |
| WO | 8907061 | * | 8/1989 | .................. 414/537 |

* cited by examiner

*Primary Examiner*—Frank E. Werner
(74) *Attorney, Agent, or Firm*—Dale J. Ream (57) ABSTRACT

A recreational vehicle carrier for use with a pickup truck having a bed and side walls comprises a first platform adapted to be fixedly mounted to the side walls of the truck and a second platform adapted to be slidably mounted to the side walls and movable therealong. The platforms present generally planar surfaces which extend between the side walls. The second platform is selectably slidable between a first position overlapping the first platform and a second position adjacent the first platform. The vehicle carrier further includes a pair of ramps removably coupled to a lateral edge of the first platform for loading or unloading a recreational vehicle. A vehicle is loaded onto the second platform when the second platform is at the first position and onto the first platform when the second platform is at the second position.

20 Claims, 6 Drawing Sheets

RECREATION VEHICLE CARRIER FOR A TRUCK

BACKGROUND OF THE INVENTION

The present invention relates generally to recreation vehicle carriers and, more particularly, to a recreation vehicle carrier which enables two recreation vehicles to be positioned thereon without repositioning a ramp assembly.

All-terrain vehicles (ATV's) are relatively small four-wheeled recreation vehicles powered by a motorcycle engine. In recent years, ATV's have become a popular source of recreation and have also found use in rural and mountainous environments for accessing areas difficult to reach by automobiles. However, ATV's may not be driven on streets or highways and, consequently, must frequently be transported by truck or trailer. While a single ATV can be transported in the bed of most trucks, two ATV's will not fit lengthwise in the truck bed.

Several carrier devices have been proposed in the prior art for hauling two ATV's in or over the bed of a truck, such as those disclosed in U.S. Pat. Nos. 5,281,075 and 4,874,284 to Tatman and Truitt, respectively. Although assumably effective in operation, the existing vehicle carriers require a repositioning of the loading ramps following the loading of a first vehicle before a second vehicle can be loaded. This step is inconvenient and difficult because the loading ramps are typically made of a heavy material such as iron.

Therefore, it is desirable to have a recreation vehicle carrier for use with pickup trucks having various dimensions which allows two ATV's to be loaded or unloaded without repositioning loading ramps. It is also desirable to have a recreation vehicle carrier which supports two ATV's above the side walls of a truck, leaving the truck bed available for transport of other items. Further, it is desirable to have a vehicle carrier which includes a complete peripheral barrier for retaining two ATV's thereon.

SUMMARY OF THE INVENTION

A recreation vehicle carrier for use with a pickup truck according to the preferred embodiment of the present invention includes a frame assembly having a pair of laterally spaced apart rails connected at their ends by end bars. The frame assembly presents dimensions substantially equal to the dimensions of the bed of a truck such that the rails of the frame assembly may be supported by the side walls of the truck. The frame assembly may be mounted to the side walls of a truck with a plurality of posts depending from the rails and adapted to mate with the spaced apart stake pockets in the side walls of a pickup truck. Turnbuckles attached to the first platform may also be coupled to the stake pockets and tensioned to securely mount the vehicle carrier to the side walls.

A first platform is fixedly attached to the rails and extends therebetween. A second platform is slidably coupled to the rails and extends therebetween. The second platform has a longitudinal dimension smaller than the longitudinal dimension of a truck bed such that the second platform is slidably movable between a first position adjacent the first platform and a second position overlapping the first platform.

The vehicle carrier also includes a pair of loading ramps. Each ramp includes a first end having a cylindrical mounting member for coupling the ramp to a bracket which extends outwardly from each rail adjacent the first platform. The ramps may be removably coupled to one side of the first platform for selectably loading a vehicle onto the first or second platform. The ramps may be removably coupled to the other side of the first platform for unloading a vehicle from the first or second platform. Thus, a vehicle may be loaded and unloaded in a forward direction. The vehicle carrier also includes safety barriers about a periphery thereof which preclude a vehicle from accidentally falling off a platform during loading.

Therefore, a general object of this invention is to provide a vehicle carrier which can support two recreation vehicles above the bed of a pickup truck.

Another object of this invention is to provide a vehicle carrier, as aforesaid, which may be supported by the side walls of a pickup truck.

Still another object of this invention is to provide a vehicle carrier, as aforesaid, including a first platform having a fixed position and a second platform slidably movable between a first position overlapping the first platform and a second position adjacent the first platform.

Yet another object of this invention is to provide a vehicle carrier, as aforesaid, in which two recreation vehicles may be loaded onto the first and second platforms without repositioning loading ramps.

A further object of this invention is to provide a vehicle carrier, as aforesaid, in which a recreation vehicle may be loaded and unloaded in a forward direction.

A still further object of this invention is to provide a vehicle carrier, as aforesaid, which can cover the bed of the truck to which it is mounted for protecting items stored therein.

A particular object of this invention is to provide a vehicle carrier, as aforesaid, having safety barriers extending upwardly about a periphery thereof for preventing a loaded vehicle from accidentally falling from a platform.

Another particular object of this invention is to provide a vehicle carrier, as aforesaid, in which portions of the safety barriers are pivotal for being selectably opened or closed during loading/unloading or transport, respectively.

A further object of this invention is to provide a vehicle carrier, as aforesaid, in which the second platform may be selectably allowed to move relative to the first platform or held in the second position adjacent the first platform.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

The preferred embodiment of the recreation vehicle carrier for a truck will now be described with reference to FIGS. 1–5 of the accompanying drawings.

Figure 4:
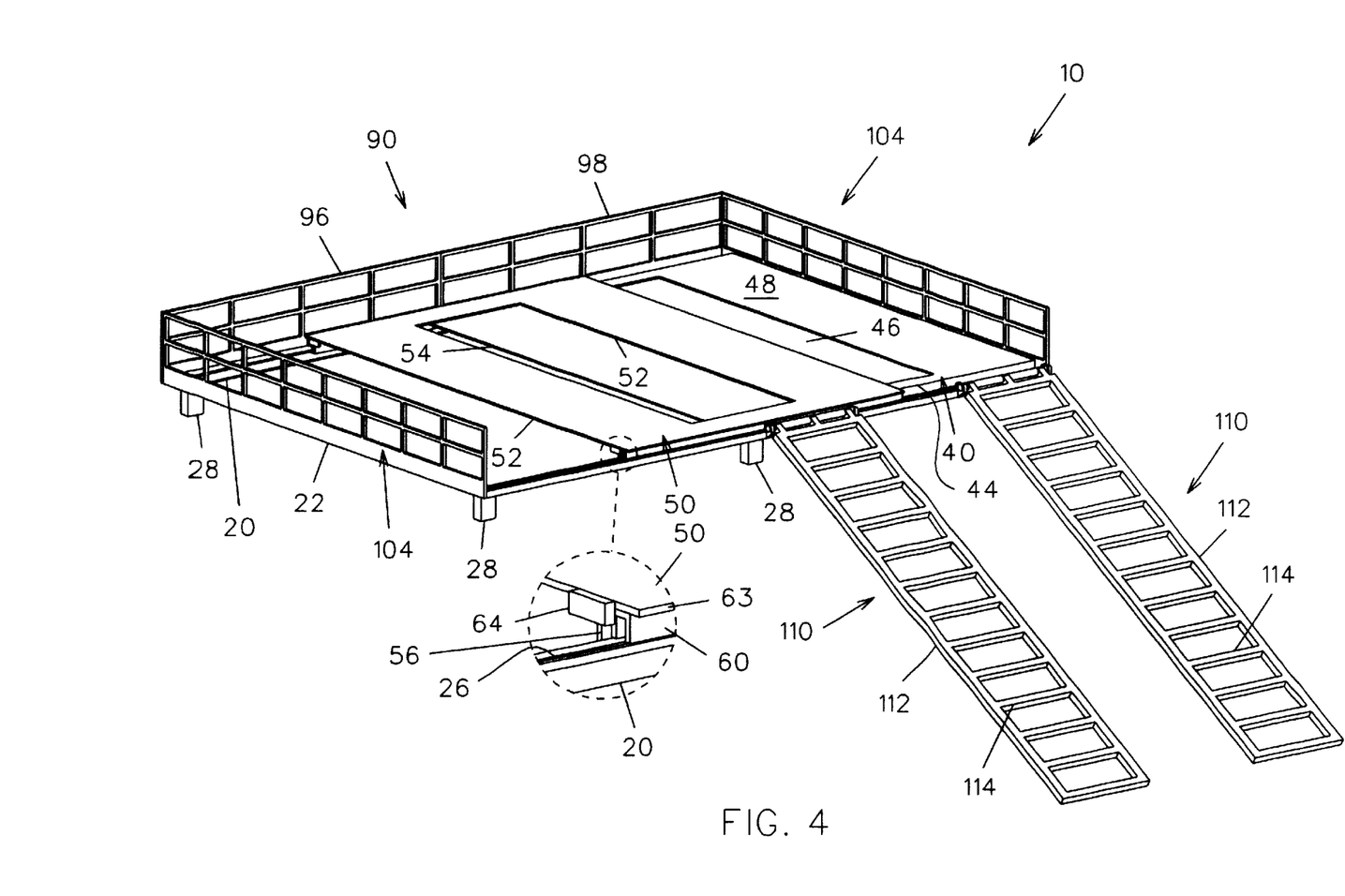
FIG. 4 is a front perspective view of the vehicle carrier assembly as in FIG. 1 with a safety barrier removed and an enlarged view of the roller assembly.

The preferred embodiment of the vehicle carrier 10 includes a frame assembly having a pair of spaced apart elongate rails 20 (FIG. 4). Front and rear end bars 22, 24 are fixedly attached to and extend between ends of the rails 20 such that the frame assembly presents a rectangular configuration. It is understood that the dimensions of the frame assembly are substantially the same as the dimensions of the bed of a pickup truck 12 such that the frame assembly may be mounted to the side walls 14 thereof. A groove 26 extends longitudinally along the top surface of each rail 20.

A plurality of spaced apart posts 28 depend from the bottom of each rail 20. The posts 28 are configured to mate with the stake pockets 16 formed in the side walls 14 of most pickup trucks. Thus, the frame assembly may be removably mounted to a truck 12 by resting the rails 20 upon the side walls thereof and inserting the posts 28 into the pockets 16 therein. A pad 30 constructed of rubber or the like may be adhesively attached to the side walls 14 of the truck prior to mounting the frame assembly to minimize damage thereto. Another mode of attachment may be used for mounting the frame assembly to trucks not having stake pockets 16 or where the dimensions of the assembly does not conform perfectly to the dimensions of the truck bed, as to be further described below.

Figure 5:
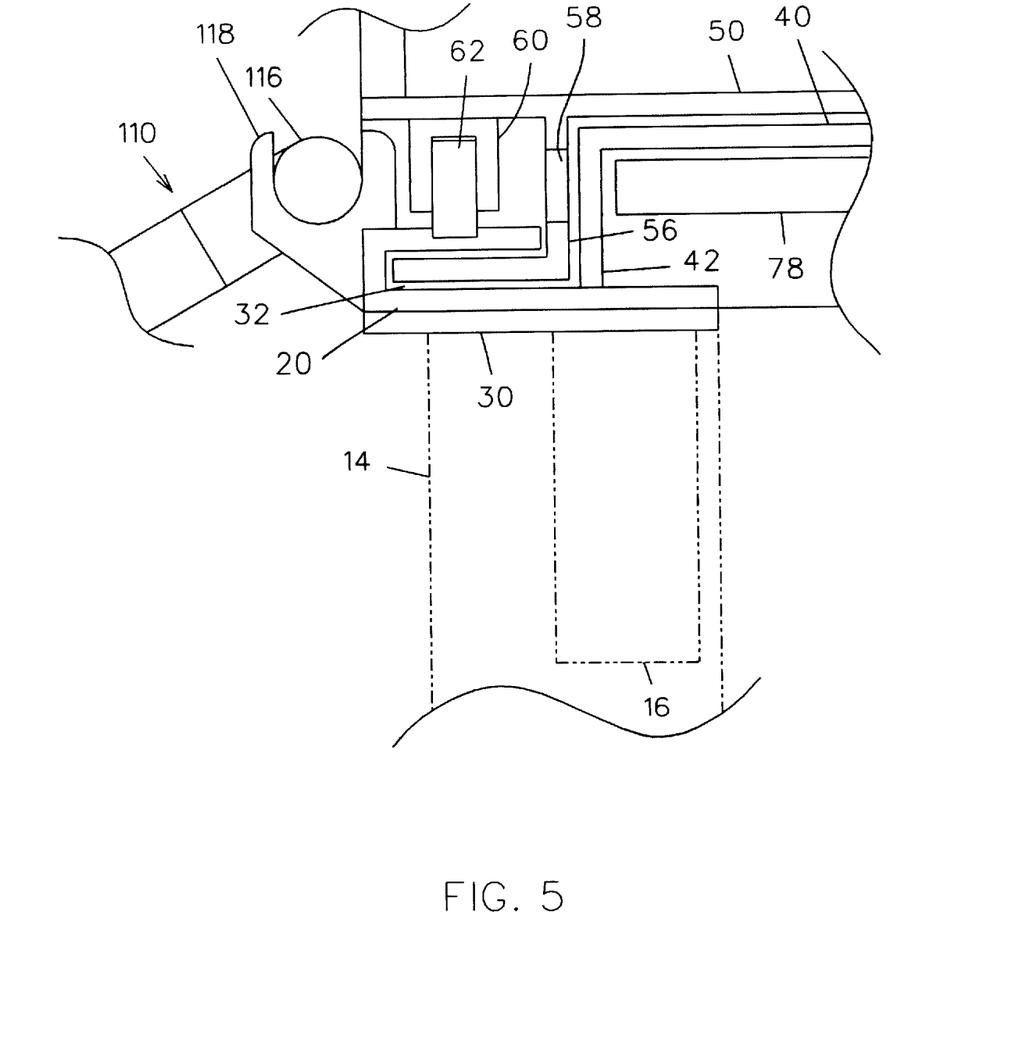
FIG. 5 is a fragmentary end view of a portion of the vehicle carrier as in FIG. 1 on an enlarged scale.

The vehicle carrier includes a first platform 40 having side walls 42 normal to opposed lateral edges 44 of a planar surface and extending downwardly therefrom. The side walls 42 are fixedly attached to the rails 20 (FIG. 5). The planar surface includes a rectangular cutout 46 between opposed support portions 48. Preferably, the first platform 40 extends between the rear end bar 24 and the midpoint of the rails 20 although the first platform 40 may alternatively be fixedly attached to the front end bar 22 of the frame assembly and extend rearwardly therefrom.

The vehicle carrier 10 further includes a second platform 50 slidably mounted to the rails 20 and extending therebetween. The second platform 50 also includes opposed support surface portions 52 having a rectangular cutout 54 therebetween. The second platform 50 presents dimensions complementary to the dimensions of the first platform 40 such that the entire bed of a truck is covered when the platforms are in adjacent positions. Each rail 20 forms a channel 32 having an interiorly open end for receiving an L-shaped side wall 56 depending from the second platform 50 (FIG. 5). It should be appreciated that the side wall 56 elevates the second platform 50 slightly above the elevation of the first platform 40. Spaced apart roller assemblies 60 depend from the lower surface of the second platform 50 adjacent lateral edges 63 thereof. Each roller assembly 60 extends along the entire length of the second platform 50 and includes a plurality of rollers 62, such as caster wheels, therein. The rollers 62 extend through a slot in the bottom of a roller assembly 60 and mate with the groove 26 in a rail 20. Therefore, the second platform 50 is slidably coupled to the rails 20 and is selectably movable between a first position overlapping the first platform 40 and a second position adjacent the first platform 40. The second platform 50 also includes rubber stoppers 64 for absorbing impact forces with the front end bar 22 when moved to the second position.

Figure 1:
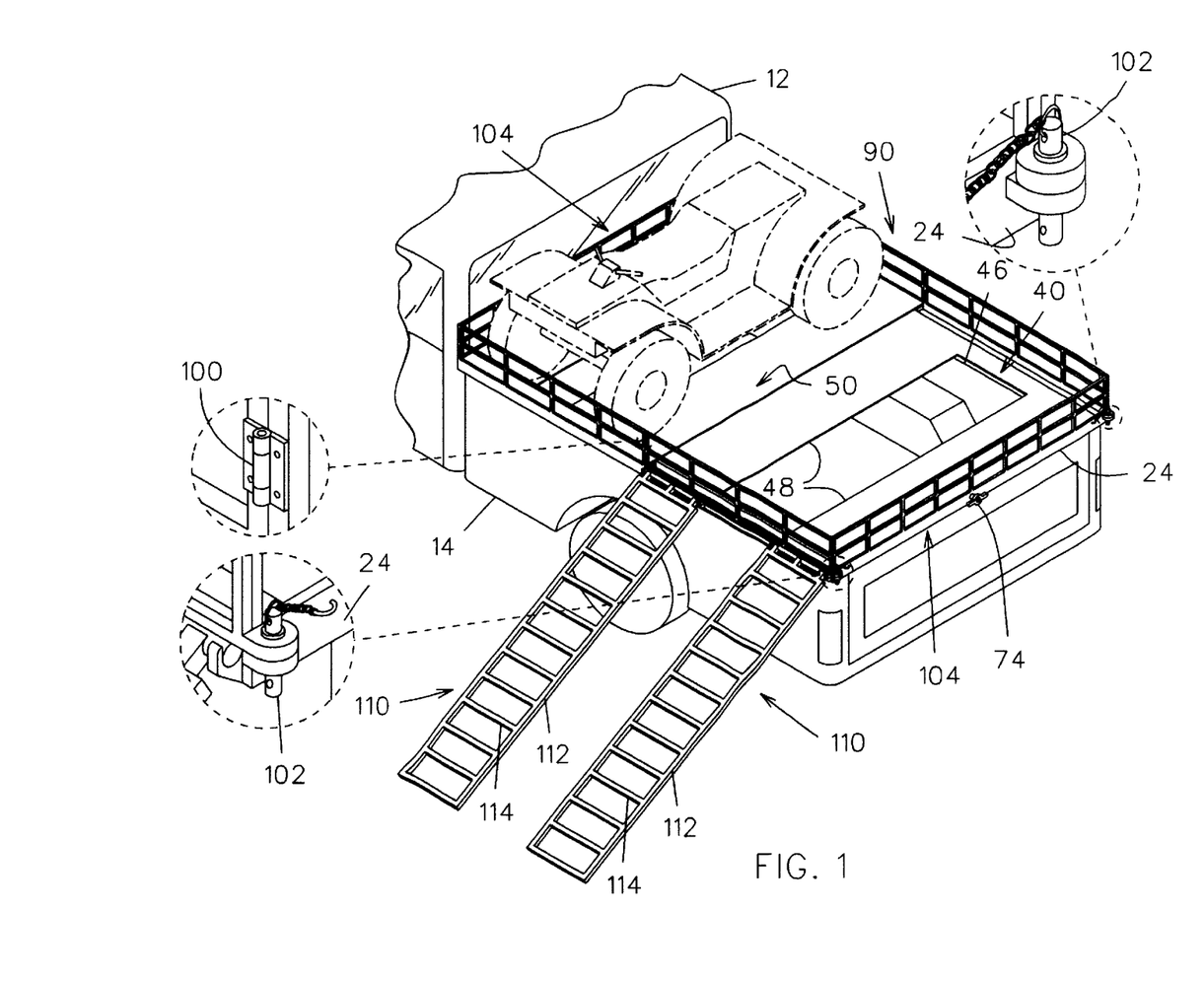
FIG. 1 is a perspective view of a vehicle carrier mounted to the bed of a pickup truck according to the present invention with enlarged views of the hinge and locking elements of the safety barrier gate portions.
Figure 2:
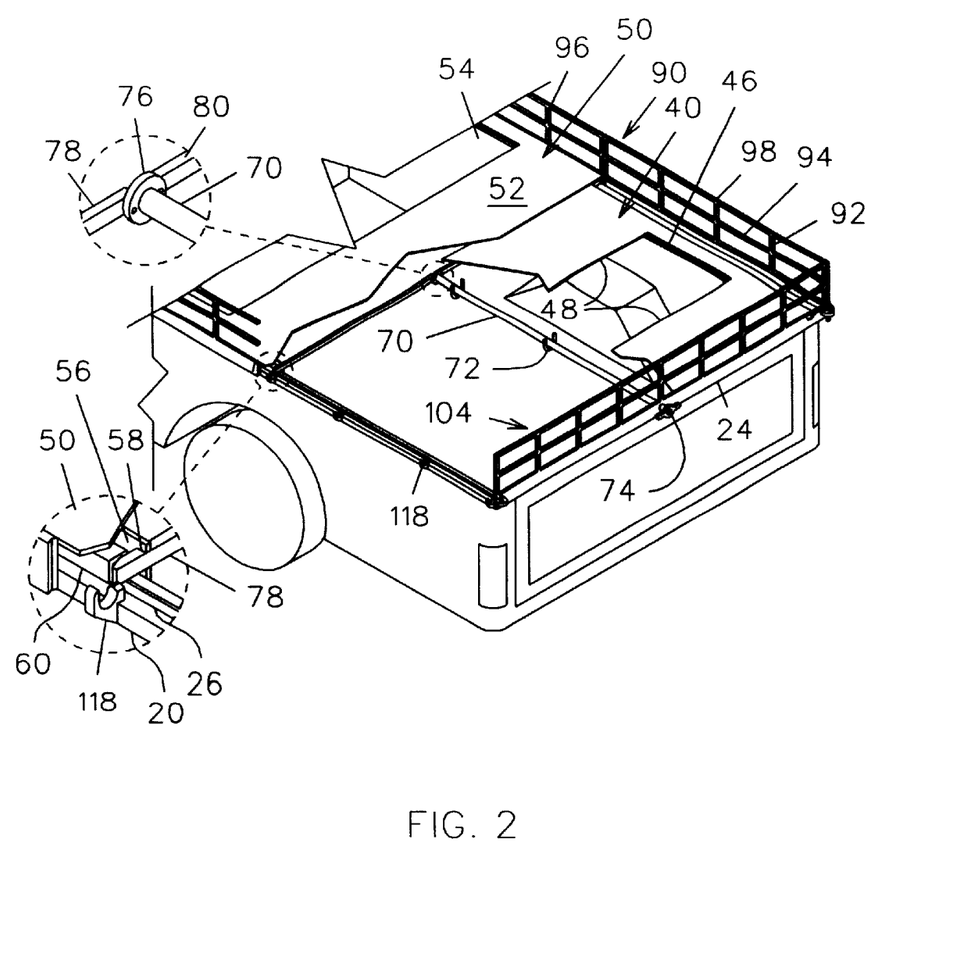
FIG. 2 is a fragmentary view of the vehicle carrier as in FIG. 1 with a portion of the first platform removed.
Figure 3:
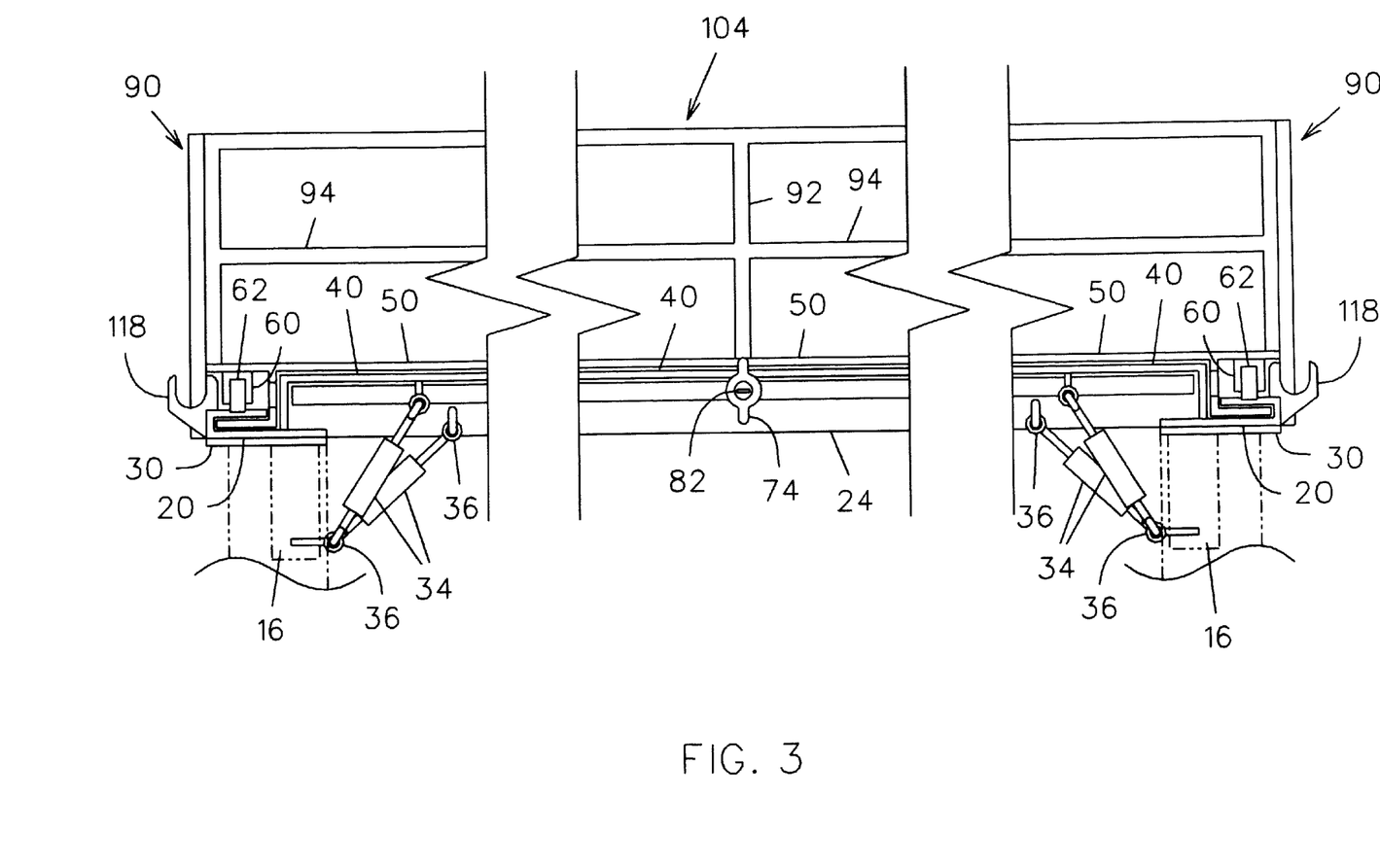
FIG. 3 is a fragmentary end view of the vehicle carrier as in FIG. 1.

The vehicle carrier 10 includes a locking assembly having a first rod 70 extending beneath the first platform and supported thereunder by brackets 72. One end of the first rod 70 extends through the rear end bar 24 of the frame assembly and is fixedly attached to a handle 74. The other end of the first rod 70 is fixedly attached to a circular coupling 76 which, in turn, is attached to second 78 and third 80 rods normal to the first rod 70 (FIG. 2). The coupling 76 is configured such that a rotation of the handle 74 by a user selectably operates to pivotally move free ends of the second 78 and third 80 rods from a first position displaced from the rails 20 (FIG. 5) and a second position adjacent the top surfaces thereof (FIG. 2). In the first position, the rods 78, 80 do not obstruct the side walls 56 or roller assemblies 60 of the second platform 50, thus allowing the second platform 50 to slide freely along the rails 20. In the second position, however, the rods 78, 80 extend through a notch 58 in the side wall 56 of the second platform 50 as well as to a position blocking the roller assemblies 60 from sliding along the rails 20. Therefore, a user can selectably allow the second platform 50 to slidably overlap the first platform 40 for loading a second vehicle or hold the second platform 50 in a position adjacent the first platform 40 for loading a first vehicle. The handle 74 may include a lock 82 such that the position of the second platform 50 can only be modified by a user having a key to the lock 82.

The vehicle carrier 10 can also be secured to the bed of a truck 12 with turnbuckles 34. Fasteners 36 such as I-bolts can be attached to selected stake pockets 16, the rear end bar 24, and the bottom of the planar surface of the first platform 40. Opposing ends of a turnbuckle 34 can then be removably coupled with corresponding fasteners 36 in a stake pocket 16 and rear end bar 24, and a stake pocket 16 and the first platform 40. Utilizing turnbuckles 34 on opposing sides of the frame assembly allows the frame assembly to be tightly secured to the side walls 14 of a truck bed even where the frame assembly presents a dimension slightly different from that of the truck bed.

The vehicle carrier 10 also includes safety barriers. A side safety barrier 90 is attached to each rail 20 and includes a plurality of spaced apart vertical support members 92 with cross-members 94 extending therebetween. A portion 96 of each side barrier 90 is fixedly attached to a rail 20 while another portion forms a gate 98 pivotally coupled to the fixed portion 96 with a hinge 100. Each gate 98 is releasably coupled to the rear end bar 24 with a pin 102 or other fastener. The pin 102 may be loosely coupled to the rear end bar 24 with a spring or wire for preventing loss thereof. A padlock could also be used to hold a gate 98 in a closed position to prevent theft of a recreation vehicle. End barriers 104 having a construction similar to the fixed portions of the side barriers 90 are fixedly attached to the end bars 22, 24 of the frame assembly.

A pair of ramps 110 may be removably coupled to the rails 20 for loading and unloading vehicles from the platforms. Each ramp 110 includes a pair of spaced apart rails 112 with spaced apart rungs 114 extending therebetween. A first end of each ramp 110 includes a cylindrical mounting member 116 configured to removably mate with spaced apart U-shaped brackets 118 fixedly attached to each frame assembly rail 20, the U-shaped brackets 118 positioned adjacent the first platform 40.

In use, the vehicle carrier 10 is mounted to a pickup truck 12 having a bed with side walls 14. The rails 20 of the frame assembly may be supported by the truck bed side walls 14 with the posts 28 being inserted in the side wall stake pockets 16. The frame assembly may be further secured to the side walls 14 with turnbuckles 34. The vehicle carrier 10 is prepared for loading by first unlocking and rotating the handle 74 of the locking assembly such that the second platform 50 is free to slide along the rails 20 of the frame assembly. The second platform 50 is moved to the first position overlapping the first platform 40. The ramps 110 are coupled to the brackets 118 adjacent the first platform 40 and a corresponding gate 98 is opened. A recreation vehicle is driven up the ramps 110 and positioned on the second platform 50. The second platform 50 may be slidably moved to its second position adjacent the first platform 40 and held thereat by the locking assembly. Then, another recreation vehicle may be loaded onto the first platform 40 and the gate 98 returned to a closed position.

To unload the vehicles from the vehicle carrier 10, the ramps are coupled to brackets 118 on an opposite rail 20. Another gate 98 is opened and the vehicle resting on the first platform 40 may be driven forward down the ramps 110. The second platform 50 is then slidably moved to the first position overlapping the first platform and the vehicle resting on the second platform 50 is driven forwardly down the ramps 110.

Figure 6:
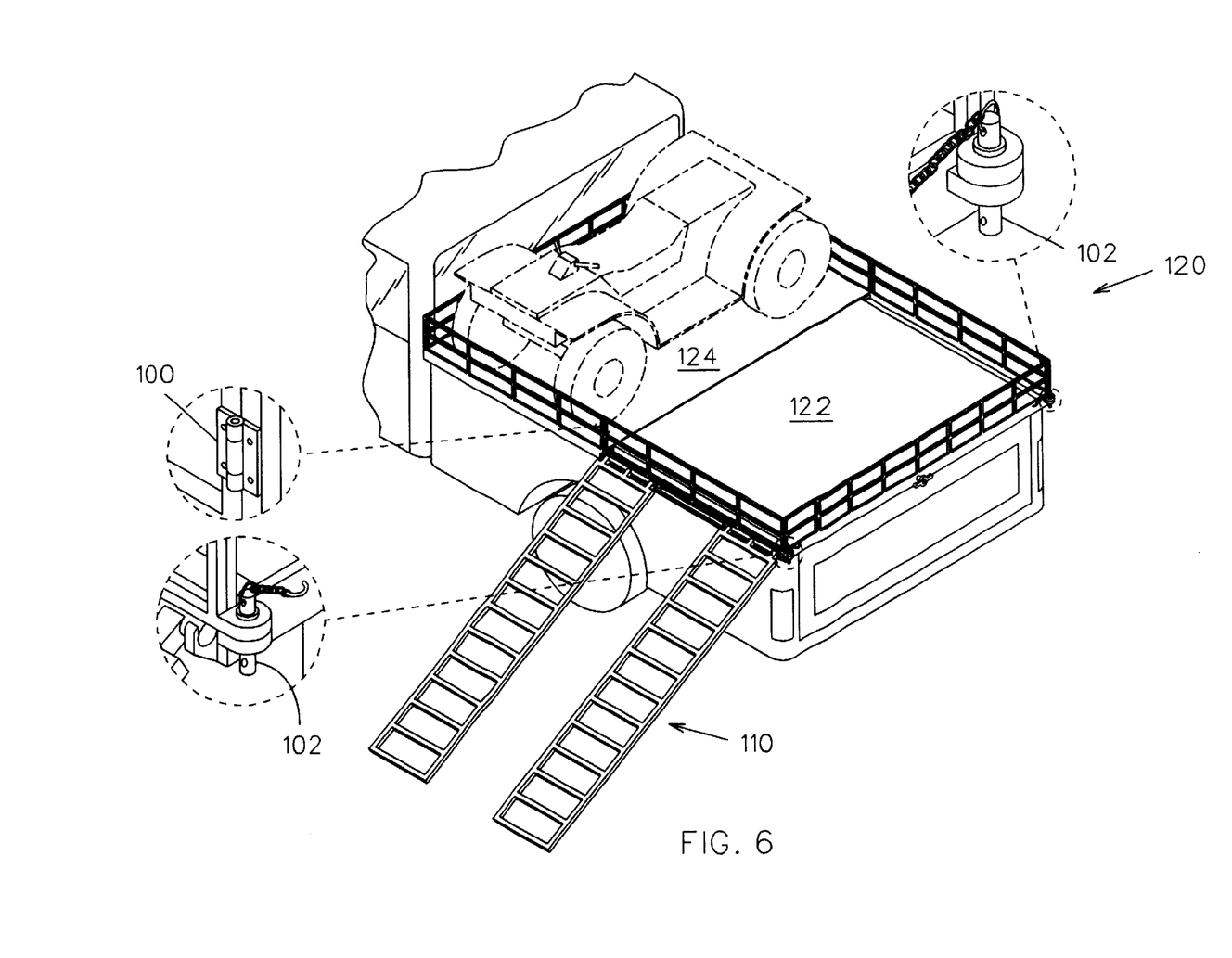
FIG. 6 is a perspective view of another embodiment of a vehicle carrier mounted to the bed of a pickup truck.

An alternative embodiment of the vehicle carrier 120 is shown in FIG. 6 and is substantially similar to the vehicle carrier 10 described above, except that each of the platforms 122, 124 presents a planar surface not having rectangular cutouts therein. Therefore, the platforms 122, 124 act as a bed cover when the second platform 124 is at its second position adjacent the first platform 122 such that items stored thereunder are protected from weather elements and theft.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A vehicle carrier for use with a pickup truck having a bed with laterally spaced side walls, said vehicle carrier comprising:
   a first platform adapted to be fixedly mounted via mounting means to said side walls and extending therebetween;
   a second platform adapted to be mounted via second mounting means to said side walls and extending therebetween, said second platform being selectably movable between a first position overlapping said first platform and a second position adjacent said first platform; and
   a pair of ramps removably coupled to a lateral edge of said carrier for loading a recreation vehicle onto said second platform when said second platform is at said first position and for loading a recreation vehicle onto said first platform when said second platform is at said second position.

2. A vehicle carrier as in claim 1 further comprising a pair of laterally spaced apart rails adapted to be mounted to said side walls, said first platform being fixedly attached to said rails and said second platform being slidably coupled to said rails.

3. A vehicle carrier as in claim 2 wherein said second platform includes a pair of laterally spaced roller assemblies positioned adjacent lateral edges thereof, whereby said second platform is slidably movable along said rails between said first and second positions.

4. A vehicle carrier as in claim 2 wherein each said rail includes at least one post adapted to mate with a corresponding stake pocket of said truck bed.

5. A vehicle carrier as in claim 1 wherein said first and second platforms present generally rectangular configurations and include respective pairs of laterally extending support surfaces and defining rectangular cutouts between said support surfaces, whereby said support surfaces are adapted to support the wheels of the vehicle when loaded thereon.

6. A vehicle carrier for use with a pickup truck having a bed with laterally spaced side walls, said vehicle carrier comprising:
   a frame assembly having a pair of laterally spaced apart rails and a pair of opposed end bars extending between ends of said rails, said frame assembly having dimensions substantially equal to dimensions of said truck bed, whereby said rails are adapted to be supported by said side walls;
   a first platform fixedly attached to said rails and extending therebetween adapted to support a first vehicle thereon;
   a second platform slidably mounted to said rails and extending therebetween adapted to support a second vehicle thereon, said second platform having a length shorter than a length of said bed and selectably movable between a first position adjacent said first platform and a second position overlapping said first platform; and
   a pair of ramps removably coupled to a lateral edge of said carrier for loading said second vehicle onto said second platform when said second platform is at said second position and for loading said first vehicle onto said first platform when said second platform is at said first position without repositioning said ramps.

7. A vehicle carrier as in claim 6 further comprising at least one post depending from each of said rails adapted to mate with a corresponding stake pocket of said truck bed.

8. A vehicle carrier as in claim 6 further comprising:
   a first coupling having one end adapted to be removably attached to one of said side walls of said truck bed and another end removably attached to said first platform, said first coupling being selectably tensioned for holding said first platform to said one side walls; and
   a second coupling having one end adapted to be removably attached to another of said side walls opposite said one side wall and an other end removably attached to said first platform, said second coupling being selectably tensioned for holding said first platform to said another side wall.

9. A vehicle carrier as in claim 6 wherein said first and second platforms present generally rectangular configurations and include respective pairs of laterally extending support surfaces defining rectangular cutouts between said support surfaces, whereby said support surfaces are adapted to support the wheels of the vehicle when loaded thereon.

10. A vehicle carrier as in claim 6 wherein said first platform presents a generally rectangular configuration having a planar surface.

11. A vehicle carrier as in claim 6 wherein said second platform includes a pair of laterally spaced roller assemblies positioned adjacent lateral edges thereof for slidable movement of said second platform along said rails.

12. A vehicle carrier as in claim 6 wherein each said rail includes a bracket adjacent said first platform; and
   each said ramp includes a first end and a second end and a mounting cylinder attached to each said first end, each said mounting cylinder removably mating with a respective bracket for loading or unloading the vehicle.

13. A vehicle carrier as in claim 6 further comprising a lock assembly having a first bar and a second bar pivotally coupled to said first bar, said second bar selectably movable between an unlocked position allowing slidable movement of said second platform between said first and second positions and a locked position retaining said second platform in said first position.

14. A vehicle carrier as in claim 6 further comprising a pair of safety barriers extending along respective said rails, each said barrier including a gate pivotally coupled to said respective rail and selectably movable between a first open position for loading a vehicle onto said first or second platform and a second closed position for retaining said loaded vehicle on said respective first or second platform.

15. A vehicle carrier for use with a pickup truck having a bed with laterally spaced side walls, said vehicle carrier comprising:
   a frame assembly having a pair of laterally spaced apart rails and a pair of opposed end bars extending between ends of said rails, said frame assembly having dimensions substantially equal to dimensions of said bed whereby said rails are adapted to be supported by said side walls;
   a first platform fixedly attached to said rails and extending therebetween adapted to support a first vehicle thereon;
   a second platform slidably mounted to said rails and extending therebetween adapted to support a second vehicle thereon, said second platform having a length shorter than a length of said bed and selectably movable between a first position adjacent said first platform and a second position overlapping said first platform;
   a pair of ramps removably coupled to a lateral edge of said carrier for loading said second vehicle onto said second platform at said second position and for loading said first vehicle onto said first platform at said first position without repositioning said ramps; and
   a gate pivotally coupled to one of said rails adjacent said first platform and movable between a first open position for loading the vehicle onto said first or second platform and a second closed position for retaining said loaded vehicle on a respective one of said platforms.

16. A vehicle carrier as in claim 15 further comprising at least one post depending from each of said rails adapted to mate with a corresponding stake pocket of said truck bed.

17. A vehicle carrier as in claim 15 further comprising:
   a first coupling having one end adapted to be removably attached to one of said side walls of said truck bed and another end removably attached to said first platform, said first coupling being selectably tensioned for holding said first platform to said one side wall; and
   a second coupling having one end adapted to be removably attached to another of said side walls opposite said one side wall and another end removably attached to said first platform, said second coupling being selectably tensioned for holding said first platform to said another side wall.

18. A vehicle carrier as in claim 15 wherein said first and second platforms present generally rectangular configurations and include respective pairs of laterally extending support surfaces defining rectangular cutouts between said support surfaces, whereby said support surfaces are adapted to support the wheels of the vehicle when loaded thereon.

19. A vehicle carrier as in claim 15 wherein said second platform includes a pair of laterally spaced roller assemblies positioned adjacent lateral edges thereof for slidable movement of said second platform along said rails.

20. A vehicle carrier as in claim 15 wherein each said rail includes a bracket adjacent said first platform; and each said ramp includes a first end and a second end and a mounting cylinder attached to each said first end, each said mounting cylinder removably mating with a respective bracket for loading or unloading a vehicle.

* * * * *